US009304374B2

(12) United States Patent
Oishi et al.

(10) Patent No.: US 9,304,374 B2
(45) Date of Patent: Apr. 5, 2016

(54) FOCAL-PLANE SHUTTER, OPTICAL DEVICE, AND METHOD FOR ADJUSTING CURRENT FOR FOCAL-PLANE SHUTTER

(71) Applicant: SEIKO PRECISION INC., Narashino-shi (JP)

(72) Inventors: Seiichi Oishi, Narashino (JP); Minori Murata, Narashino (JP); Shoichi Tokura, Narashino (JP); Hiroshi Takahashi, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/862,420

(22) Filed: Sep. 23, 2015

(65) Prior Publication Data
US 2016/0011491 A1     Jan. 14, 2016

Related U.S. Application Data

(63) Continuation of application No. PCT/JP2014/053719, filed on Feb. 18, 2014.

(30) Foreign Application Priority Data

Jun. 25, 2013   (JP) ................. 2013-133164

(51) Int. Cl.
G03B 9/40     (2006.01)

(52) U.S. Cl.
CPC ....................... G03B 9/40 (2013.01)

(58) Field of Classification Search
CPC .............. G03B 9/16; G03B 9/18; G03B 9/32; G03B 9/40
See application file for complete search history.

(56) References Cited

U.S. PATENT DOCUMENTS

| 4,394,081 | A | * | 7/1983 | Hashimoto | G03B 9/62 396/466 |
| 4,395,105 | A | * | 7/1983 | Senuma | G03B 9/18 396/456 |
| 4,596,453 | A | * | 6/1986 | Fujino | G03B 9/18 396/469 |

(Continued)

FOREIGN PATENT DOCUMENTS

| JP | S61-185734 | 8/1986 |
| JP | H04-50827 | 4/1992 |

(Continued)

OTHER PUBLICATIONS

International Search Report for International Application No. PCT/JP2014/053719 dated Apr. 28, 2014.

*Primary Examiner* — WB Perkey
(74) *Attorney, Agent, or Firm* — Kratz, Quintos & Hanson, LLP (57) ABSTRACT

A focal-plane shutter includes: a mechanical portion including: a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a current value flowing through at least one of the leading blade coil and the trailing blade coil is adjusted such that one of variations in a leading blade run-up period and a trailing blade run-up period depending on a temperature change corresponds to the other one.

7 Claims, 10 Drawing Sheets

(56) References Cited

U.S. PATENT DOCUMENTS

| | | | |
|---|---|---|---|
| 2004/0047626 A1* | 3/2004 | Miyazaki | G03B 9/40 396/489 |
| 2004/0223757 A1* | 11/2004 | Nakano | G03B 9/18 396/489 |
| 2013/0322866 A1 | 12/2013 | Suzuki | |
| 2015/0234257 A1* | 8/2015 | Takahashi | G03B 9/42 396/489 |

FOREIGN PATENT DOCUMENTS

| | | |
|---|---|---|
| JP | 2002-116478 A1 | 4/2002 |
| JP | 2002-139771 A1 | 5/2002 |
| JP | 2003-15189 A1 | 1/2003 |
| JP | 2008-256844 A1 | 10/2008 |
| JP | 2010-181522 A1 | 8/2010 |
| JP | 2012-215658 A1 | 11/2012 |

* cited by examiner

FOCAL-PLANE SHUTTER, OPTICAL DEVICE, AND METHOD FOR ADJUSTING CURRENT FOR FOCAL-PLANE SHUTTER

CROSS-REFERENCE TO RELATED APPLICATION

This application is a continuation of and claims priority to International Patent Application No. PCT/JP2014/053719 filed on Feb. 18, 2014, which claims priority to Japanese Patent Application No. 2013-133164 filed on Jun. 25, 2013, subject matter of these patent documents is incorporated by reference herein in its entirety.

BACKGROUND (i) Technical Field

The present invention relates to focal-plane shutters, optical devices, and methods for adjusting current for the focal-plane shutters.

(ii) Related Art

Japanese Unexamined Patent Application Publication Nos. 2010-181522 and 2008-256844 disclose a focal-plane shutter in which a leading blade and a trailing blade are driven by use of electromagnets.

In a case where actuators are employed as drive sources for driving the leading blade and the trailing blade, an exposure period might vary depending on a temperature change.

SUMMARY

According to an aspect of the present invention, there is provided a focal-plane shutter including: a mechanical portion including: a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, a trailing blade run-up period is from a time when the trailing actuator starts being energized such that the trailing blade closes the opening to a time when the trailing blade starts closing the opening, and a current value flowing through at least one of the leading blade coil and the trailing blade coil is adjusted such that one of variations in the leading blade run-up period and the trailing blade run-up period depending on a temperature change corresponds to the other one.

DETAILED DESCRIPTION

Figure 1:
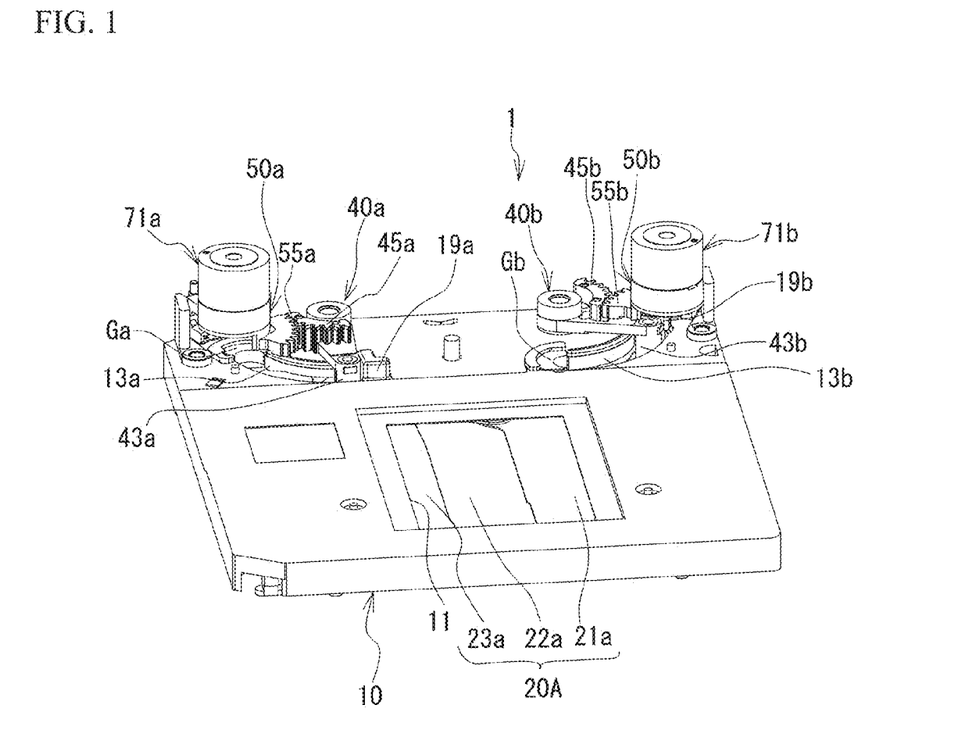
FIG. 1 is an external perspective view of a focal-plane shutter according to the present embodiment.
Figure 2:
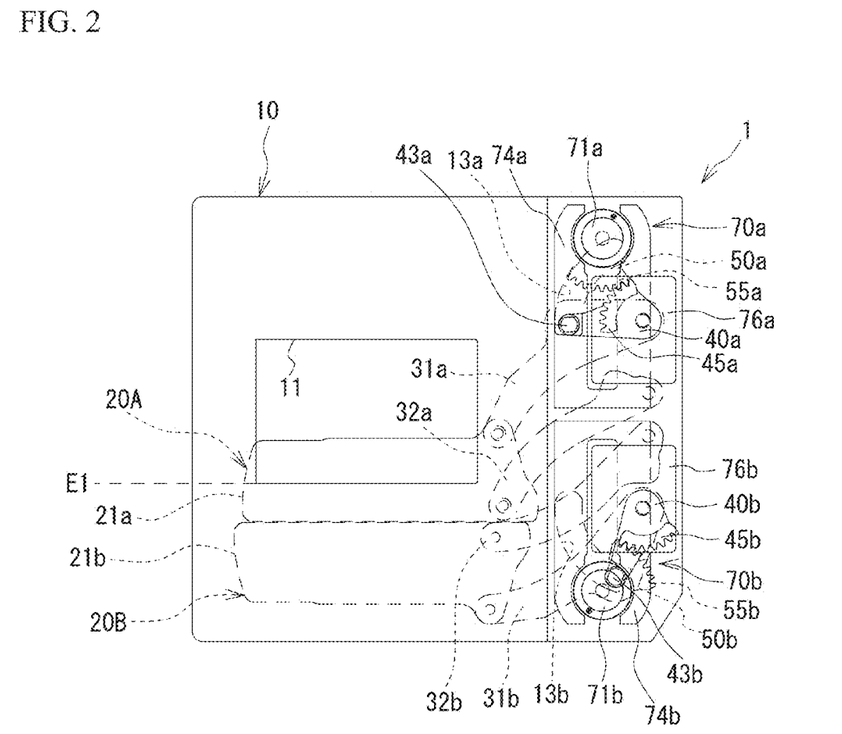
FIG. 2 is a front view of the focal-plane shutter.

FIG. 1 is an external perspective view of a focal-plane shutter 1. FIG. 2 is a front view of the focal-plane shutter 1. The focal-plane shutter 1 is employed in an optical device such as a digital camera or a still camera. The focal-plane shutter 1 includes a board 10, a leading blade 20A, a trailing blade 20B, arms 31a, 32a, 31b, and 32b, drive levers 40a and 40b, output members 50a and 50b, and rotors 71a and 71b. Additionally, stators and coils are omitted in FIG. 1. The board 10 includes an opening 11. The leading blade 20A and the trailing blade 20B open and close the opening 11. The rotor 71a is included in an actuator 70a for driving the leading blade 20A. The rotor 71b is included in an actuator 70b for driving the trailing blade 20B. In FIG. 1, the rotors 71a and 71b related to the actuators 70a and 70b are illustrated. The rotors 71a and 71b are examples of a leading blade rotor and a trailing blade rotor.

The leading blade 20A includes plural blades 21a to 23a, and the trailing blade 20B also includes plural blades. Additionally, in FIG. 2, the blades other than the blade 21a of the leading blade 20A and a blade 21b of the trailing blade 20B are omitted. Each of the leading blade 20A and the trailing blade 20B can shift between an overlapped state where the plural blades overlap one another and an expanded state where the plural blades are expanded. These plural blades recede from the opening 11 in the overlapped state to bring the opening 11 into a fully opened state. These plural blades close the opening 11 in the expanded state to bring the opening 11 into a fully closed state. FIGS. 1 and 2 illustrate the state where the expanded leading blade 20A closes the opening 11 and the trailing blade 20B recedes from the opening 11.

The leading blade 20A is connected to the arms 31a and 32a. The trailing blade 20B is connected to the arms 31b and 32b. As illustrated in FIG. 2, each of the arms 31a, 32a, 31b, and 32b are rotatably supported in the board 10.

The drive levers 40a and 40b drive the arms 31a and 31b, respectively. The drive levers 40a and 40b are provided with drive pins 43a and 43b connected to the arms 31a and 31b, respectively. The board 10 is formed with escape slots 13a and 13b for permitting the movement of the drive pins 43a and 43b, respectively. The drive levers 40a and 40b will be described later in detail. The rotors 71a and 71b are respectively connected to the output members 50a and 50b. Specifically, the rotors 71a and 71b are press-fitted into the output members 50a and 50b, respectively. An end portion of the rotor 71a near the board 10 side has a small diameter, and the output member 50a is press fitted onto this portion. The rotation of the rotors 71a and 71b rotates the output members 50a and 50b, so the drive levers 40a and 40b rotates, which drives the leading blade 20A and the trailing blade 20B, respectively. The positions of rotational axes of the output members 50a and 50b and the drive levers 40a and 40b differ from one another. The output members 50a and 50b are examples of a leading blade output member and a trailing blade output member, respectively.

The output members 50a and 50b and the drive levers 40a and 40b are respectively formed with gear portions 55a, 55b, 45a, and 45b. The gear portions 55a and 45a mesh with each other, and the gear portions 55b and 45b mesh with each other, so that the rotation of the output members 50a and 50b respectively rotate the drive levers 40a and 40b.

The actuators 70a and 70b respectively drive the drive levers 40a and 40b. The actuator 70a includes: a rotor 71a; a stator 74a energized to exert a magnetic force between the stator 74a and the rotor 71a; and a coil 76a for energizing the stator 74a. The rotor 71a is a permanent magnet magnetized to different polarities in the circumferential direction. The energization of the coil 76a rotates the rotor 71a to rotate the output member 50a and the drive lever 40a. The rotation of the drive lever 40a causes the leading blade 20A to run. In addition, the reverse energization of the coil 76a reversely rotates the rotor 71a, so the leading blade 20A runs in the opposite direction to the above-mentioned one. Similarly, the actuator 70b includes the rotor 71b, a stator 74b, and a coil 76b. The energization of the coil 76b rotates the rotor 71b to rotate the output member 50b and the drive lever 40b, so that the trailing blade 20B runs. In addition, the reverse energization of the coil 76b causes the trailing blade 20B to run in the opposite direction to the above-mentioned one. The coils 76a and 76b are examples of a leading blade coil and a trailing blade coil.

As illustrated FIG. 1, the board 10 is formed with a positioning portion 19a near one end of the escape slot 13a. Likewise, a positioning portion 19b is formed near one end of the escape slot 13b. The other ends of the escape slots 13a and 13b are provided with rubbers Ga and Gb for absorbing the impact of the drive levers 40a and 40b, respectively. In addition, the board 10 is assembled with a holder holding the above actuators 70a and 70b not illustrated.

Figure 3:
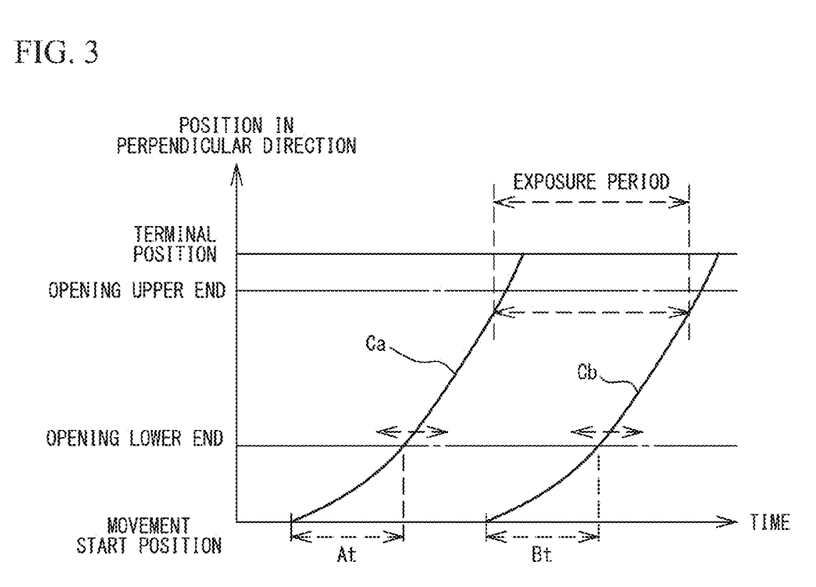
FIG. 3 is an explanatory view of a change in an exposure period.

Next, a description will be given of a variation in the exposure period depending on a temperature change. In some cases, a change in the temperature of the environment where the focal-plane shutter 1 is used can change the exposure period. FIG. 3 is an explanatory view of a change in the exposure period. Curves Ca and Cb respectively indicate ideal running states of the leading blade 20A and the trailing blade 20B at room temperature. Depending on the temperature of the environment in which the focal-plane shutter 1 is used, the running characteristics of the leading blade 20A and the trailing blade 20B change. In particular, a run-up period At of the leading blade 20A and a run-up period Bt of the trailing blade 20B greatly change. For example, when only the run-up period At of the leading blade 20A becomes shorter, the exposure period becomes longer, and when only the run-up period At of the leading blade 20A becomes longer, the exposure period becomes shorter. When only the run-up period Bt of the trailing blade 20B becomes shorter, the exposure period becomes shorter, and when only the run-up period Bt of the trailing blade 20B becomes longer, the exposure period becomes longer.

Additionally, the run-up period At of the leading blade 20A is a period from the time when the actuator 70a is energized in a state where the leading blade 20A stops and closes the opening 11 to the time when the leading blade 20A starts running to open the opening 11. Specifically, the period is from the time when the coil 76a starts being energized to the time when the opening 11 starts being opened by moving the blades 21a of the leading blade 20A illustrated in FIG. 2 away from a lower end E1 of the opening 11. The run-up period Bt of the trailing blade 20B is a period from the time when the actuator 70b starts being energized in a state where the trailing blade 20B stops away from the opening 11 to the time when the opening 11 starts being closed by moving the trailing blade 20B. Specifically, the period is from the time when the coil 76b starts being energized to the time when the opening 11 starts being closed by moving the blade 21b of the trailing blade 20B illustrated in FIG. 2 to the lower end E1 of the opening 11. Also, the blade 21a, in the leading blade 20A, is connected to the most distal ends of the arms 31a and 32a. The blade 21b, in the trailing blade 20B, is connected to the most distal ends of the arms 31b and 32b.

Conceivably, there are two main factors of the variation in the exposure period depending on a temperature change. The first reason is the temperature change of a mechanical portion. The mechanical portion is the board 10, the leading blade 20A, the trailing blade 20B, the drive levers 40a and 40b respectively driving the leading blade 20A and the trailing blade 20B, and the output members 50a and 50b. A shape and sliding resistance of the mechanical portion changes depending on temperature. In addition, the stop positions of the leading blade 20A and the trailing blade 20B might change depending on temperature.

Figure 4A:
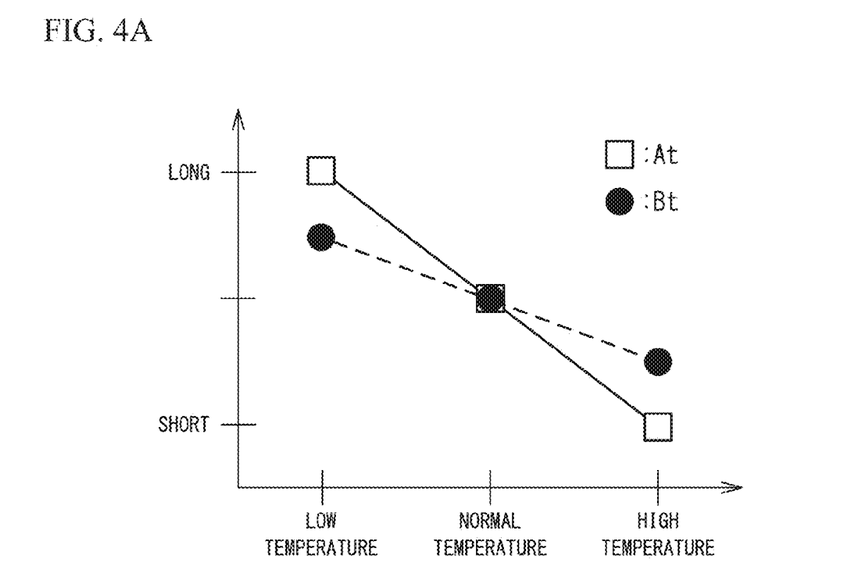
FIGS. 4A and 4B are explanatory views illustrating examples of changes in run-up periods depending only on a temperature change in a mechanical portion.
Figure 4B:
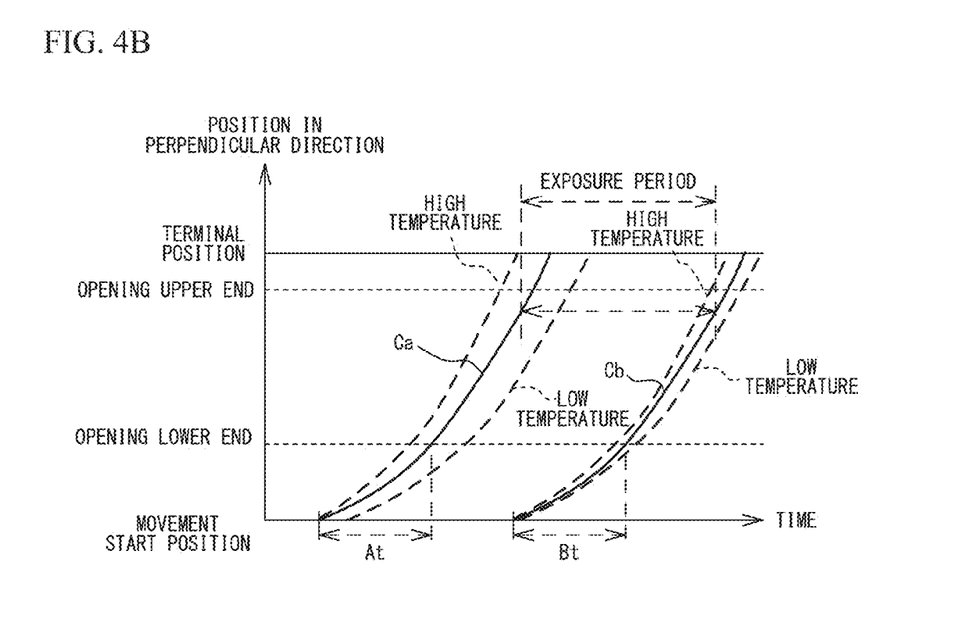

FIGS. 4A and 4B are explanatory views illustrating examples of changes in the run-up periods At and Bt depending only on the temperature change in the mechanical portion. As illustrated in FIGS. 4A and 4B, the lower the temperature of the mechanical portion is, the longer the run-up periods At and Bt become. The higher the mechanical portion is, the shorter the run-up periods At and Bt become. In addition, a change rate of the run-up period At of the leading blade 20A depending on the temperature change of the mechanical portion is greater than a change rate of the run-up period Bt of the trailing blade 20B. Here, for example, the low temperature is minus 10 degrees at room temperature, the high temperature is plus 50 degrees at room temperature, and the normal temperature is plus 20 degrees at room temperature.

Figure 5A:
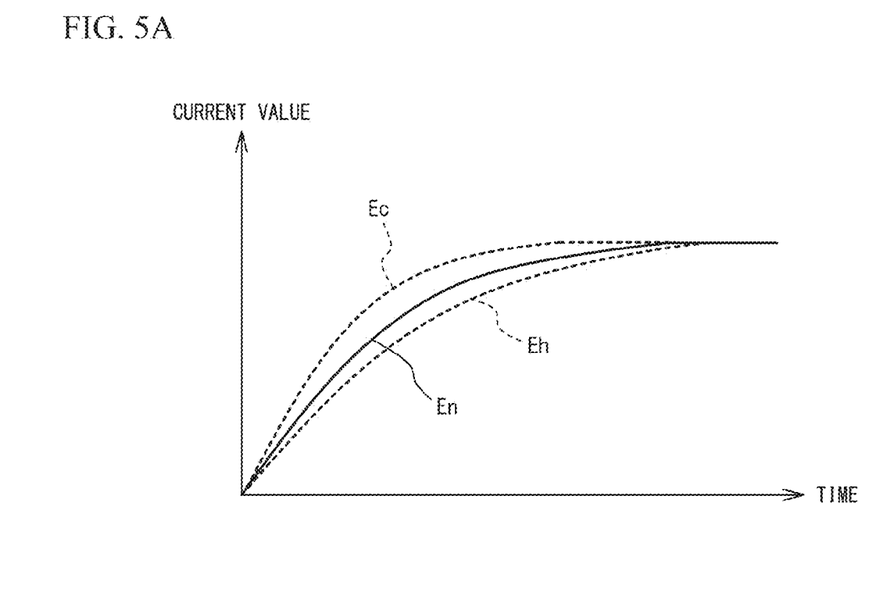
FIG. 5A is a graph illustrating a change in a rising period of a current value depending on a temperature change in a coil.
Figure 5B:
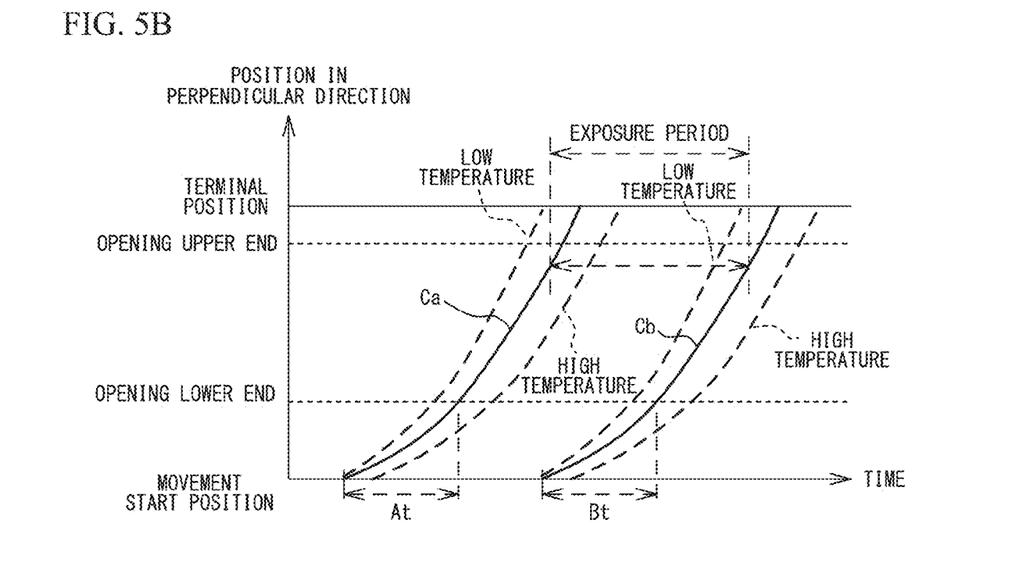
FIG. 5B is an explanatory view illustrating examples of changes in run-up periods depending only on the temperature change in coils.

The second reason is the temperature changes in the coils 76a and 76b. FIG. 5A is a graph illustrating a change in the rising period of the current value depending on the temperature change in the coil 76a. FIG. 5B is an explanatory view illustrating examples of changes in the run-up periods At and Bt depending only on the temperature changes of the coils 76a and 76b. The higher the temperature of the coil 76a is within a given temperature range, the higher the resistance of the coil 76a becomes. Curves En, Eh, and Ec indicate changes in the current value flowing through the coil 76a at the normal temperature, at the high temperature, and at the low temperature, respectively. As for the rising period from the time when the coil 76a starts being energized to the time when a desired current value flows through the coil 76a, it becomes longer at the high temperature, whereas it becomes shorter at the low temperature. The same is true for the coil 76b. Therefore, when the temperatures of the coils 76a and 76b are low, each of the run-up periods At and Bt becomes short. When the temperatures of the coils 76a and 76b are high, each of the run-up periods At and Bt becomes long. In addition, the change rate of the run-up period At depending on the temperature change in the coil 76a is substantially the same as the run-up period Bt depending on the temperature change in the coil 76b.

Also, in the focal-plane shutter 1 according to the embodiment, as illustrated in FIGS. 4B and 5B, the run-up periods At and Bt become short when only the temperature of the mechanical portion is high, whereas the run-up periods At and Bt become long when only the temperatures of the coils 76a and 76b are high. That is, the change rates of the run-up periods At and Bt are negative values when only the temperature of the mechanical portion is high, whereas the change rates of the run-up periods At and Bt are positive values when only the temperatures of the coils 76a and 76b are high. The absolute value of the change rate of the run-up period At depending on the temperature change in the mechanical portion is greater than the absolute value of the change rate of the run-up period Bt depending on the temperature change in the mechanical portion, whereas the change rate of the run-up period At depending on the temperature change in the coil 76a is substantially the same as the change rate of the run-up period Bt depending on the temperature change in the coil 76b. Additionally, the present invention is not limited to the focal-plane shutter 1 in which the run-up period changes in the described above manner.

As described above, the actual run-up periods At and Bt vary with the temperature change in the mechanical portion and the temperature changes in the coils 76a and 76b. The variation amounts, of the run-up periods At and Bt depending only on the temperature change in the mechanical portion, added to the variation amounts, of the run-up periods At and Bt depending only on the temperature changes in the coils 76a and 76b, makes the actual variation amounts of the run-up periods At and Bt, respectively.

Figure 6A:
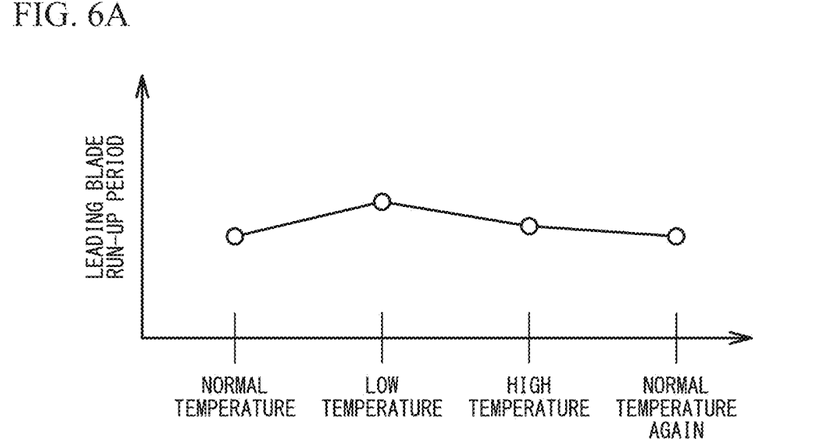
FIGS. 6A and 6B are graphs illustrating actual variations in the run-up periods.
Figure 6B:
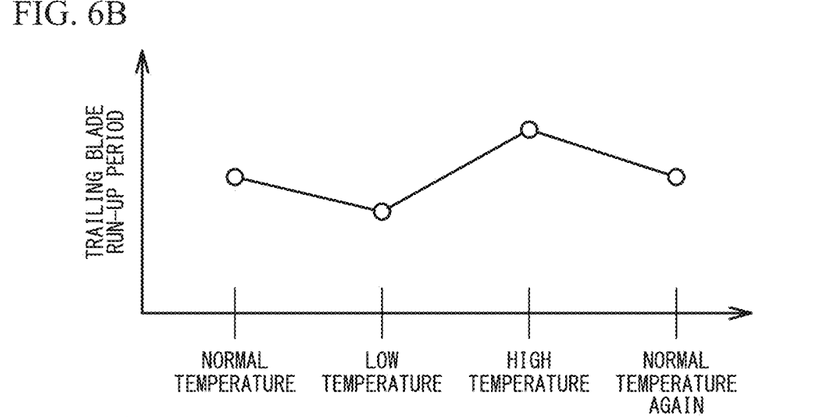
Figure 6C:
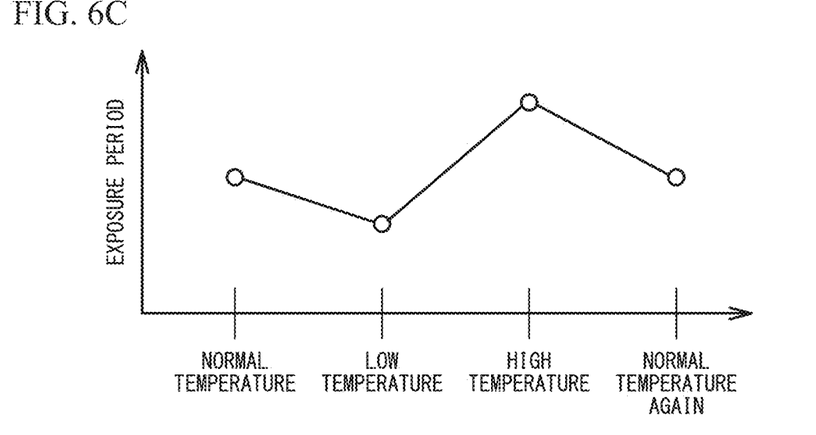
FIG. 6C is a graph illustrating an actual variation in an exposure period.

FIGS. 6A and 6B are graphs illustrating the actual variations in the run-up periods At and Bt, respectively. FIG. 6C is a graph illustrating the actual variation in the exposure period. As illustrated in FIGS. 6A and 6B, the actual change rate of the run-up period At depending on temperature is smaller than the change rate of the run-up period Bt. This is because, as illustrated in FIGS. 4B and 5B, the change rate of the run-up period At depending only on the temperature change in the mechanical portion and the change rate of the run-up period At depending only on the temperature change in the coil 76a cancel each other. In contrast, the change rate of the run-up period Bt depending only on the temperature change in the mechanical portion is small relative to the change rate of the temperature of the coil 76b. For this reason, the main cause of the actual temperature change in the run-up period Bt is the temperature change of the coil 76b.

In such a focal-plane shutter 1 according to the present embodiment, the actual run-up period At of the leading blade 20A does not greatly change depending on temperature, whereas the actual run-up period Bt of the trailing blade 20B greatly changes depending on temperature. Therefore, as illustrated in FIG. 6C, the exposure period greatly varies depending on the change in the actual run-up period Bt of the trailing blade 20B. Specifically, the exposure period becomes shorter than a desired exposure period at a low temperature, and the exposure period becomes longer than the desired exposure period at a high temperature. The present invention is not limited to the focal-plane shutter 1 in which the exposure period changes in the above manner.

Figure 7:
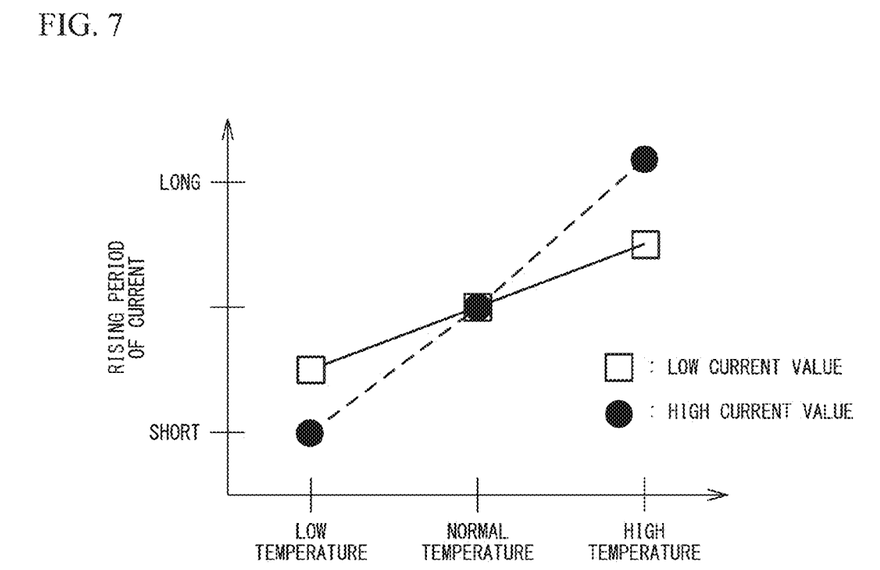
FIG. 7 is a graph illustrating a relationship between the rising period and a current value.

Here, the change rate of the rising period of the current changing depending on the temperature of the coil changes depending on a current value. FIG. 7 is a graph illustrating the relationship between the rising period and the current value. As illustrated in FIG. 7, the higher the current value actually flowing through the coil is, the greater the change rate of the rising period of the current changing depending on temperature becomes. In other words, the higher the current value is, the greater the influence of the rising period of the current depending on the temperature of the coil becomes. Therefore, the higher the current value flowing through the coil is, the greater the change rate of the run-up period of the blade depending on the temperature change becomes.

Figure 8A:
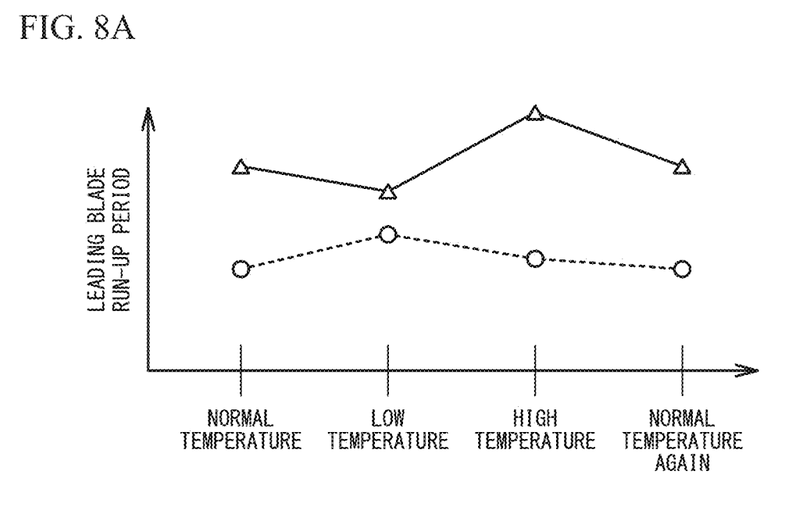
FIG. 8A illustrates the variation in the run-up period after adjustment of the current value.
Figure 8B:
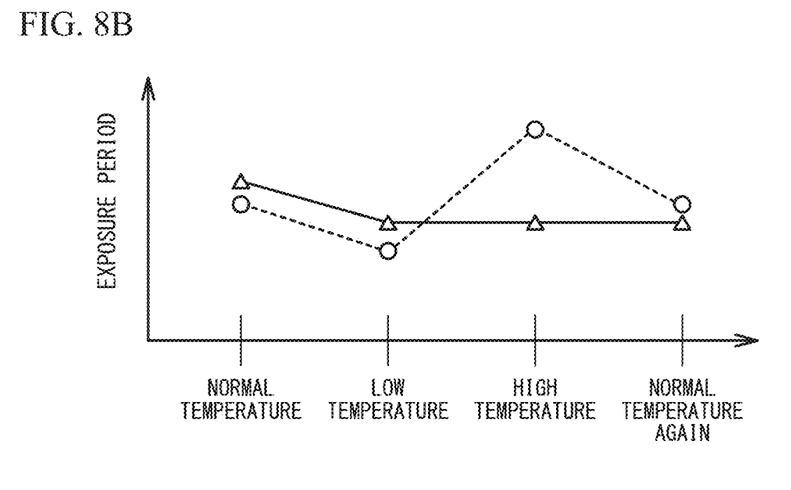
FIG. 8B illustrates the variation in the exposure period after the adjustment of the current value.

In this embodiment, by increasing the actual current value flowing through the coil 76a, the actual temperature characteristics of the run-up period At of the leading blade 20A is adjusted to correspond to the temperature characteristics of the actual run-up period Bt of the trailing blade 20B. Accordingly, the variation in the exposure period depending on the temperature change is suppressed. FIG. 8A illustrates the variation in the run-up period At after the adjustment of the current value, and FIG. 8B illustrates the variation in the exposure period after the adjustment of the current value. In FIG. 8A, the run-up period At after the adjustment of the current value flowing through the coil 76a is indicated by a solid line, and the run-up period At before the adjustment is indicated by a dotted line. By increasing the current value flowing through the coil 76a, the change rate of the run-up period At depending on only the temperature change of the coil 76a becomes greater than the change rate of the run-up period At depending on only the temperature change of the mechanical portion. As a result, the actual variation characteristics of the run-up period At approximates to the actual variation characteristics of the run-up period Bt. That is, both the run-up periods At and Bt become shorter at a low temperature and become longer at a high temperature. Thus, as illustrated in FIG. 8B, it is possible to suppress the variation in the exposure period depending on the temperature change.

Figure 9A:
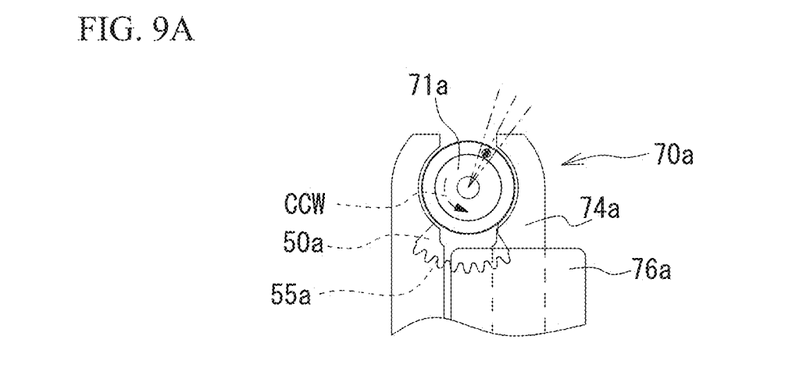
FIGS. 9A to 9C are explanatory views of examples of methods for adjusting the current value.
Figure 9B:
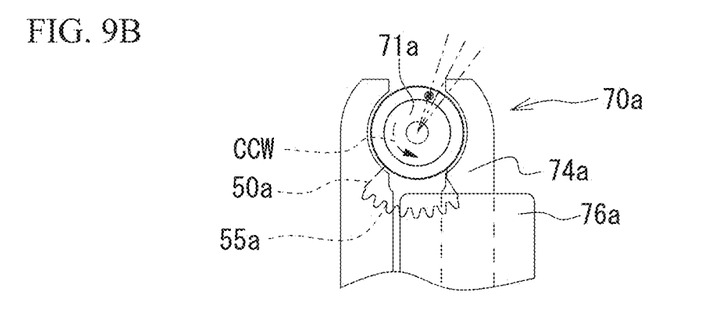
Figure 9C:
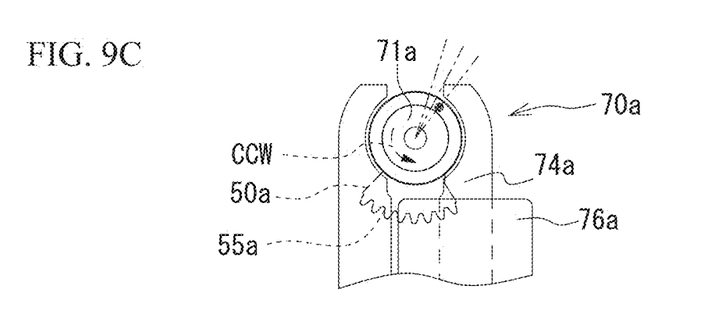

Next, a description will be given of an example of a method for adjusting the actual current value flowing through the coil 76a. FIGS. 9A to 9C are explanatory views of an example of the method for adjusting the current value. In the present embodiment, a press-fitting angle of the rotor 71a relative to the output member 50a is changed to adjust the rotational start position of the rotor 71a at the time when the leading blade 20A starts moving, so the actual current value flowing through the coil 76a is adjusted. FIG. 9A illustrates a case where the press-fitting angle is a reference angle, FIG. 9B illustrates the press-fitting angle in which the current value is smaller than that in the reference angle, and FIG. 9C illustrates the press-fitting angle in which the current value is greater than that of the reference angle. FIGS. 9A to 9C illustrates the actuator 70a in a state where the leading blade 20A stops and closes the opening 11, that is, the actuator 70a in a state before the leading blade 20A starts an exposure operation. When the exposure operation starts, the rotor 71a rotates in the counterclockwise direction CCW. Additionally, the press-fitting angle means the relative angle relative to the output member 50a in the rotational direction of the rotor 71a.

Here, in the state of FIG. 9A, the detent torque is generated in the rotor 71a so as to rotate the rotor 71a in the clockwise direction. In this embodiment, the detent torque increases when the rotor 71a rotates in the clockwise direction from the state illustrated in FIG. 9A, whereas the detent torque decreases when the rotor 71a rotates in the counterclockwise direction CCW. When the coil 76a is energized, the rotor 71a rotates against the detent torque in the counterclockwise direction CCW. The torque required for rotation against the detent torque in the counterclockwise direction CCW is referred to as a reference starting torque. As illustrated in FIG. 9B, by changing the press-fitting angle such that an N-pole is shifted with respect to the reference angle in the counterclockwise direction CCW, the detent torque of the rotor 71a is smaller than the detent torque at the reference angle. Thus, a starting torque required for the rotation of the rotor 71a in the counterclockwise direction CCW is smaller than the reference starting torque.

Therefore, when the same current value in the case of the reference angle is applied, the run-up period At becomes short. Also, to ensure the same run-up period At in the case of the reference angle, a current value lower than the current value in the case of the reference angle is applied. According to such an adjustment method, it is possible to prevent the run-up period At from being elongated by decreasing the current value.

Further, as illustrated in FIG. 9C, in a case where the press-fitting angle is changed in such a direction so as to increase the detent torque, the starting torque required for the rotation of the rotor 71a in the counterclockwise direction CCW becomes higher than the reference starting torque.

Therefore, when the same current value in the case of the reference angle is applied, the run-up period At becomes long. Also, to ensure the same run-up period At in the case of the reference angle, a current value higher than that in the reference angle has to be applied. According to such an adjustment method, it is possible to prevent the run-up period At from being shorter than the reference angle by increasing the current value.

Figure 10:
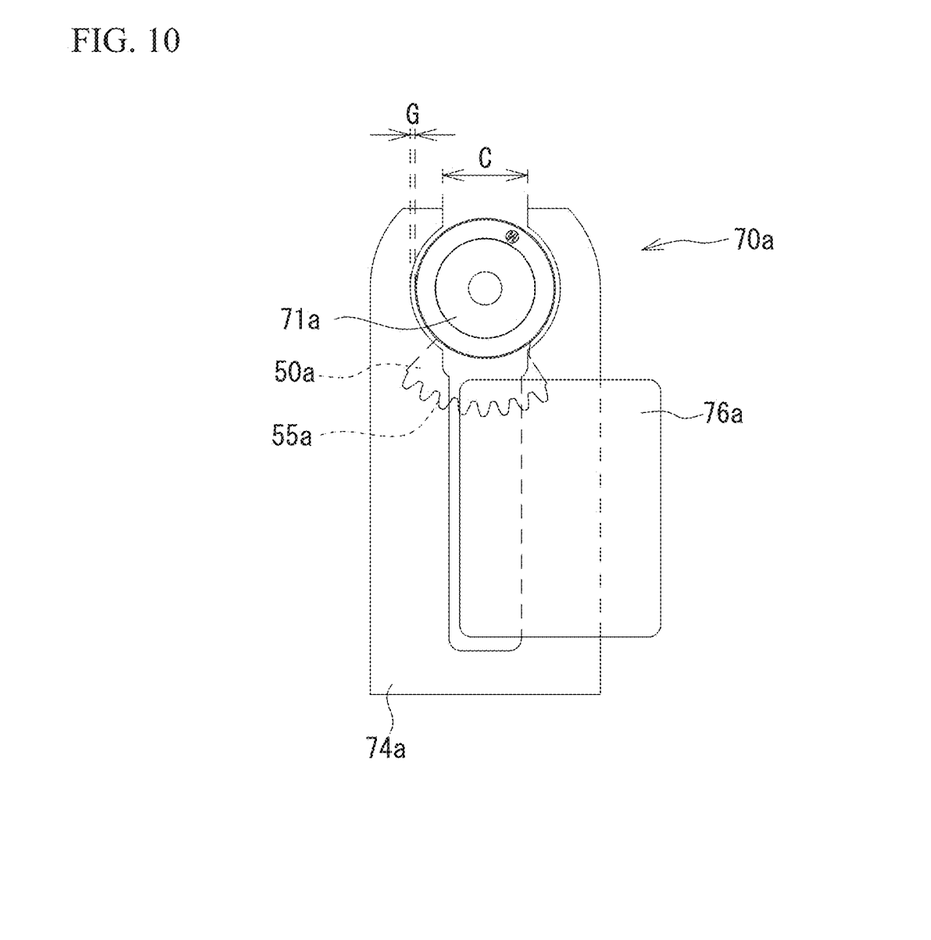
FIG. 10 is an explanatory view of another example of a method for adjusting the current value.

In addition, the actual current value flowing through the coil 76a may be also adjusted in the following manner. For example, the shape or the material of the rotor 71a may be changed. The shape or the material of the stator 74a may be changed. For example, as illustrated in FIG. 10, a clearance C, of the stator 74a, between end portions of the two arm portions sandwiching the rotor 71a may be changed. A cross-sectional shape of a magnetic path of the stator 74a may be changed. By changing the size of the rotor 71a or the shape of the stator 74a, a gap G between the end portions of the rotor and the stator may be changed. The number of turns of the coil 76a may be changed. Also, at least one of a shape, weight, and a material of at least one of members driven by the actuator 70a, specifically, the blades of the leading blade 20A, the arms 31a and 32a, the drive lever 40a, and the output member 50a may be changed. By changing the shape of the blade 21a of the leading blade 20A, the distance of the run-up may be changed. By changing these, it is possible to adjust the actual current value flowing through the coil 76a.

In the example illustrated in FIGS. 6A to 6C, the current value of the coil 76b may be reduced instead of changing the current value of the coil 76a. By reducing the current value flowing through the coil 76b, the change rate of the current value flowing through the coil 76b depending on the temperature change in the coil 76b is reduced. This makes it possible to reduce the change rate of the run-up period Bt depending only on the temperature change in the coil 76b. Thus, the change rate of the run-up period Bt depending only on the temperature change in the coil 76b can be substantially the same as the change rate of the run-up period Bt depending only on the temperature change in the mechanical portion. Thus, the actual change rate of the run-up period Bt can be suppressed to approximate to the change range of the actual run-up period At illustrated in FIG. 6A. Accordingly, the variation in the exposure period depending on the temperature change can be suppressed.

Also, both the current values of the coils 76a and 76b may be adjusted, and they may be adjusted so as to increase the current value of the coil 76a and to reduce the current value of the coil 76b.

The adjustment of the actual current value flowing through the coil 76b can be achieved in the following similar method. The rotational start position of the rotor 71b, namely, the press-fitting angle of the output member 50b relative to the rotor 71b may be changed. By changing at least one of the shape and the material of the rotor 71b, the shape and the material of the stator 74b, and the number of turns of the coil 76b, the actual current value flowing through the coil 76b may be changed. Also, by changing at least one of the members driven by the trailing blade actuator 70b, specifically, at least one of the blades of the trailing blade 20B, the arms 31b and 32b, the drive lever 40b, and the output member 50b, the actual current value flowing through the coil 76b may be adjusted. By changing the shape of the blade 21b of the trailing blade 20B, the distance of the run-up may be changed.

The adjustment of the current of the coils 76a and 76b described heretofore is effective in the case where the exposure period at a low temperature is short and the exposure period at a high temperature is long as illustrated in FIG. 6C. Moreover, it is effective in a case where the exposure period at a low temperature is short and the exposure period at a high temperature is substantially the same as the desired exposure period, and in a case where the exposure period at a low temperature is substantially the same as the desired exposure period and the exposure period at a high temperature is long.

For example, in the case where the exposure period at a low temperature is long and the exposure period at a high temperature is short, the current value of the coil 76a is adjusted to be reduced, or the current value of the coil 76b is adjusted to be increased. Alternatively, the current value of the coil 76a is adjusted to be reduced, and the current value of the coil 76b is adjusted to be increased. This can suppress the variation in the exposure period. It is effective in a case where the exposure period at a low temperature is long and the exposure period at a high temperature is substantially the same as the desired exposure period, and in a case where the exposure period at a low temperature is substantially the same as the desired exposure period and the exposure period at a high temperature is short.

While the exemplary embodiments of the present invention have been illustrated in detail, the present invention is not limited to the above-mentioned embodiments, and other embodiments, variations and modifications may be made without departing from the scope of the present invention.

Additionally, the method for fixing the output member 50a with the rotor 71a is not limited to the press fitting. The output member 50a may be directly fixed with the rotor 71a, for example, a rotational spindle rotating with the rotor 71a. The output member 50a may directly drive the arm 31a without through the drive lever 40a.

Finally, several aspects of the present invention are summarized as follows.

According to an aspect of the present invention, there is provided a focal-plane shutter including: a mechanical portion including: a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, a trailing blade run-up period is from a time when the trailing actuator starts being energized such that the trailing blade closes the opening to a time when the trailing blade starts closing the opening, and a current value flowing through at least one of the leading blade coil and the trailing blade coil is adjusted such that one of variations in the leading blade run-up period and the trailing blade run-up period depending on a temperature change corresponds to the other one.

According to another aspect of the present invention, there is provided a focal-plane shutter including: a mechanical portion including: a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, a trailing blade run-up period is from a time when the trailing actuator starts being energized such that the trailing blade closes the opening to a time when the trailing blade starts closing the opening, and a current value flowing through at least one of the leading blade coil and the trailing blade coil is adjusted such that one of variations in the leading blade run-up period and the trailing blade run-up period depending on a temperature change corresponds to the other one.

According to another aspect of the present invention, there is provided an optical device including a focal-plane shutter including: a mechanical portion including: a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, a trailing blade run-up period is from a time when the trailing actuator starts being energized such that the trailing blade closes the opening to a time when the trailing blade starts closing the opening, and a current value flowing through at least one of the leading blade coil and the trailing blade coil is adjusted such that one of variations in the leading blade run-up period and the trailing blade run-up period depending on a temperature change corresponds to the other one.

According to another aspect of the present invention, there is provided a method for adjusting current for a focal-plane shutter, the focal-plane shutter including: a mechanical portion including: a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, and a trailing blade run-up period is from a time when the trailing actuator starts being energized such that the trailing blade closes the opening to a time when the trailing blade starts closing the opening, the method includes adjusting a current value flowing through at least one of the leading blade coil and the trailing blade coil such that one of variations in the leading blade run-up period and the trailing blade run-up period depending on a temperature change corresponds to the other one.

What is claimed is:
1. A focal-plane shutter comprising:
a mechanical portion including:
 a board including an opening; and
 a leading blade and a trailing blade capable of opening and closing the opening; and
a leading blade actuator and a trailing blade actuator respectively driving the leading blade and the trailing blade, and respectively including a leading blade coil and a trailing blade coil,
wherein
a leading blade run-up period is from a time when the leading actuator starts being energized such that the leading blade opens the opening to a time when the leading blade starts opening the opening,
a trailing blade run-up period is from a time when the trailing actuator starts being energized such that the trailing blade closes the opening to a time when the trailing blade starts closing the opening, and
a current value flowing through at least one of the leading blade coil and the trailing blade coil is adjusted such that one of variations in the leading blade run-up period and the trailing blade run-up period depending on a temperature change corresponds to the other one.

2. The focal-plane shutter of claim 1, wherein
each of the leading blade run-up period and the trailing blade run-up period is shorter as temperature of the mechanical portion is higher,
the leading blade run-up period and the trailing blade run-up period are longer as temperature the leading blade coil and the trailing blade coil are higher, respectively, and
change rates of the leading blade run-up period and the trailing blade run-up period against respective temperatures of the leading blade coil and the trailing blade coil are greater as respective current values flowing through the leading blade coil and the trailing blade coil are higher, respectively.

3. The focal-plane shutter of claim 2, wherein a change rate of the leading blade run-up period against temperature of the mechanical portion is greater than that of the trailing blade run-up period against temperature of the mechanical portion, and
a current value flowing through the leading blade coil is higher than a current value flowing through the trailing blade coil.

4. The focal-plane shutter of claim 1, wherein
a current value flowing through the leading blade coil or the trailing blade coil is adjusted by changing at least one of a rotational start position of a rotor of the leading blade actuator, a rotational start position of a rotor of the trailing blade actuator, a shape and a material of the rotor of the leading blade actuator, a shape and a material of the rotor of the trailing blade actuator, a shape and a material of a stator of the leading blade actuator, a shape and a material of a stator of the trailing blade actuator, a number of turns of the leading blade coil, a number of turns of the trailing blade coil, weight and a shape of a member driven by the leading blade actuator, and weight and a shape of a member driven by the trailing blade actuator.

5. A focal-plane shutter comprising:
a mechanical portion including:
 a board including an opening; and
 a leading blade and a trailing blade capable of opening and closing the opening; and
a leading blade actuator and a trailing blade actuator respectively driving the leading blade and the trailing blade, and respectively including a leading blade coil and a trailing blade coil,
wherein
the mechanical portion includes a leading blade output member and a trailing blade output member respectively secured to the leading blade rotor and the trailing blade rotor,
a leading blade run-up period is from a time when the leading actuator starts being energized such that the leading blade opens the opening to a time when the leading blade starts opening the opening, a trailing blade run-up period is from a time when the trailing actuator starts being energized such that the trailing blade closes the opening to a time when the trailing blade starts closing the opening, and at least one of a relative angle of the leading blade rotor against the leading blade output member in a rotational direction of the leading blade rotor and a relative angle of the trailing blade rotor against the trailing blade output member in a rotational direction of the trailing blade rotor is adjusted such that one of variations in the leading blade run-up period and the trailing blade run-up period corresponds to the other one.

6. An optical device comprising a focal-plane shutter including:

a mechanical portion including:

a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, a trailing blade run-up period is from a time when the trailing actuator starts being energized such that the trailing blade closes the opening to a time when the trailing blade starts closing the opening, and a current value flowing through at least one of the leading blade coil and the trailing blade coil is adjusted such that one of variations in the leading blade run-up period and the trailing blade run-up period depending on a temperature change corresponds to the other one.

7. A method for adjusting current for a focal-plane shutter, the focal-plane shutter including:

a mechanical portion including:

a board including an opening; and a leading blade and a trailing blade capable of opening and closing the opening; and a leading blade actuator and a trailing blade actuator respectively driving the leading blade and the trailing blade, and respectively including a leading blade coil and a trailing blade coil, wherein a leading blade run-up period is from a time when the leading actuator starts being energized such that the leading blade opens the opening to a time when the leading blade starts opening the opening, and a trailing blade run-up period is from a time when the trailing actuator starts being energized such that the trailing blade closes the opening to a time when the trailing blade starts closing the opening, the method comprises adjusting a current value flowing through at least one of the leading blade coil and the trailing blade coil such that one of variations in the leading blade run-up period and the trailing blade run-up period depending on a temperature change corresponds to the other one.

* * * * *